Feb. 16, 1943.  E. H. JOHNSON  2,311,278
BUILDER'S HARDWARE
Filed April 14, 1941
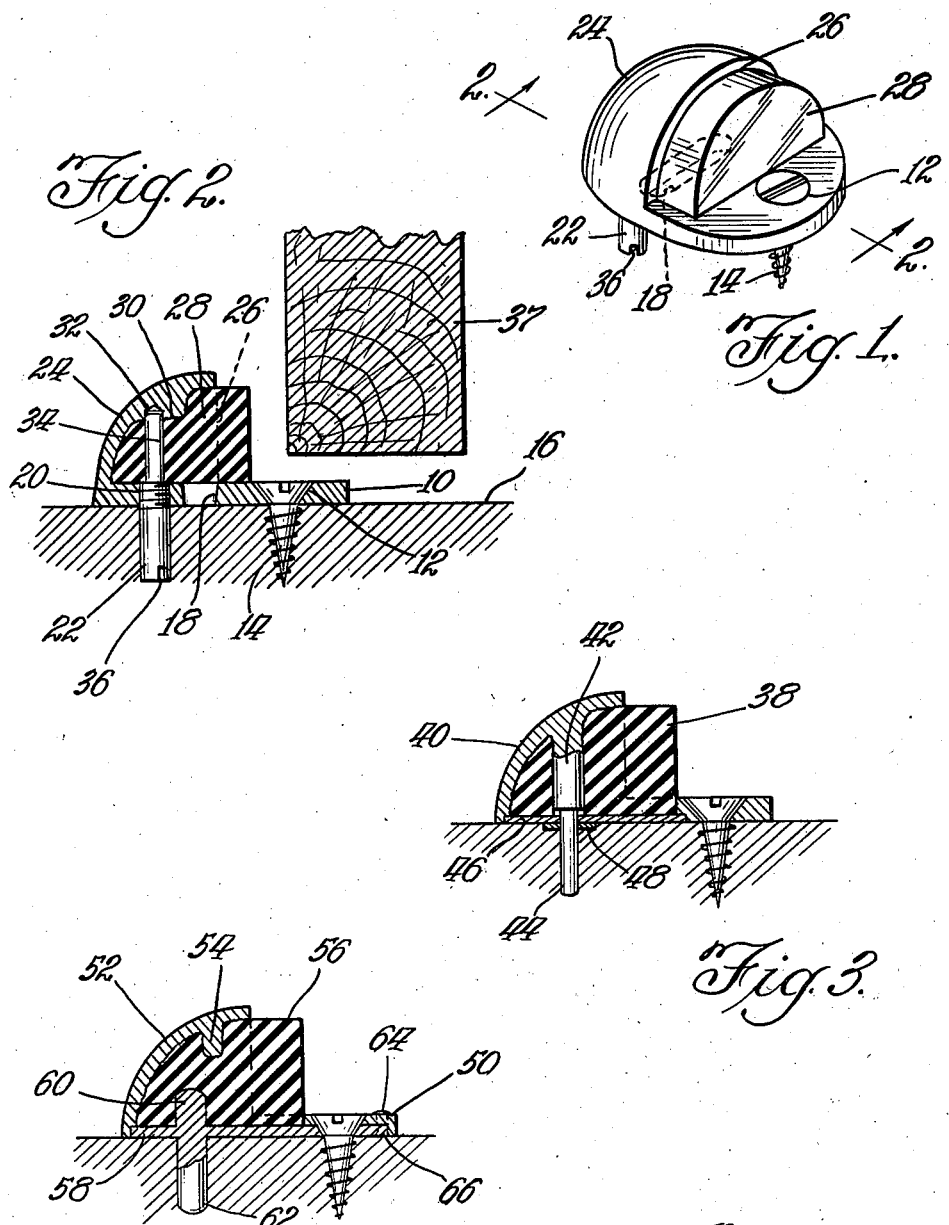
Inventor:
Elvin H. Johnson
By Freeman, Sweet & Albrecht
Attys.

Patented Feb. 16, 1943

2,311,278

UNITED STATES PATENT OFFICE 2,311,278

BUILDER'S HARDWARE

Elvin H. Johnson, Winnetka, Ill.

Application April 14, 1941, Serial No. 388,371

9 Claims. (Cl. 16—86)

My invention relates to builder's hardware and includes among its objects and advantages the provision of an improved door bumper of the type constructed to be attached to the floor, which is both durable and particularly immune to accidental or mischievous damage.

In the accompanying drawing

Figure 1 is a perspective view of a device according to the invention;

Figure 2 is a section as on line 2—2 of Figure 1;

Figure 3 is a similar section of a modification, and

Figure 4 is a similar section of a second modification.

In the embodiment of the invention selected for illustration in Figures 1 and 2, I have indicated a bronze base or floor plate 10 apertured at 12 to receive fastening means 14 for fastening it in place on a floor 16 or other similar structure. The base 10 has a cored aperture 18 provided for convenience in casting and cleaning and a threaded aperture 20 to receive a positioning and retaining stud 22 described in detail hereinafter.

Above the left half of the base 10 is provided the dome 24 which is substantially a portion of a hollow sphere, cut away in a vertical plane at 26 to define a pocket for receiving the rubber bumper 28. Both the outer and inner surfaces of the dome 24 are substantially spherical except for the boss 30 which provides an increased thickness of metal in line with the aperture 20, and is counterbored at 32 to receive the upper tip of the reduced upper portion 34 of the stud 22.

To assemble the parts, the casting is placed in a suitable supporting jig and the rubber 28 is pressed home into the position of Figure 2. While the rubber is thus being pressed into place the stud 22 is forced into position and threaded home, being provided with a screwdriver slot at 36 to facilitate the assembly. I prefer to design and proportion the rubber so that when it is pushed into firm abutment with the dome 24 the aperture for receiving the stud extension 34 is still a little to the right of the axis of the stud as shown in Figure 2 so that insertion of stud jams the rubber a little between the stud and the dome. Except for the counterbore 32, the inner surface of the dome 24 is left with the fine surface corrugations resulting from sand casting or a similar casting process, which further increases the gripping action between the rubber 28 and the dome 24. The combined gripping action resulting from wedging the rubber into the dome and subsequently binding it additionally by the stud extension 34 is such that any one experimenting to see how firmly the rubber is fastened in place, either as a matter of curiosity or as a matter of mischief, will find it quite impossible to get the rubber out, short of tearing it into small pieces with a screw driver, chisel, or the like.

The workman installing the device first drills a hole in the floor to receive the stud 22 and then places the device in the position shown in Figure 2 and drives home the fastening screw 14, with the rubber 28 suitably positioned to receive and cushion the impact of the door 37.

In the embodiment illustrated in Figure 3 the finished structure operates the same as in Figure 2, but the rubber 38 is inserted through the bottom, the base being cut away for that purpose. And the dome 40 is provided with a relatively large upper stud 42 having a smaller continuation 44 adapted to enter the floor or other support. The rubber 38 is held in place by a retaining plate 46, which, in turn, is held in place by a washer 48 which is a press fit forced home over the extension 44.

In the embodiment of Figure 4 the base 50 may be identical with that in Figure 3 but the dome 52 is provided with a short knob or stud 54 set a little farther forward than the stud 42. The rubber 56 may be inserted through the bottom or the front, and the closure plate 58 is a casting having a short upwardly projecting stud 60 and a downwardly projecting stud 62. In assembly at the factory and until installation by the user, the plate 58 may be held in place by a pair of rivets or studs 64 bent over under its right hand edge as at 66, or by merely peening over the adjacent portion of the base.

Without further elaboration, the foregoing will so fully explain my invention that others may, by applying knowledge current at the time of application, readily adapt the same for use under various conditions of service.

I claim:

1. A door bumper of the type adapted for mounting on a floor, comprising, in combination: a base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient one piece rubber cushioning member having a portion shaped to fit snugly in said dome, and a portion projecting from said first portion past the plane of said opening; a stud threaded through a central portion of said bottom and projecting below the said bottom and above the said bottom at least to near the top of said cavity; said first cushioning member portion having a bore to receive said stud; said projecting portion having substantially the shape of a right cylinder; said bore, in the undistorted condition of said member lying farther from the closed end of said cavity than the axis of said stud, whereby said stud forces said member out of its undistorted condition and maintains local compression strain and stress in said member, in the space between said stud and the closed end of said cavity; said base plate having an opening in the end remote from said cavity to receive a fastening member for fastening said base plate to a floor.

2. A bumper, comprising, in combination: a base plate; a hollow dome integral with said base plate and defining a cup-shaped cavity having an approximately spherical wall adjacent one end of said plate and an opening lying in a plane perpendicular to said plate and facing away from said spherical wall; a resilient one piece rubber cushioning member having a portion shaped to fit snugly in said dome, and a portion projecting from said first portion past the plane of said opening; said cup-shaped cavity having a rough inner surface; a stud threaded through a central portion of said base plate and projecting into said cavity; said first cushioning member portion having a bore to receive said stud.

3. A door bumper of the type adapted for mounting on a floor, comprising, in combination: a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient rubber cushioning member having a portion shaped to fit snugly in said dome; and a portion projecting from said first portion past the plane of said opening; a stud passing through a central portion of said bottom and projecting above the said bottom; said first cushioning member portion having a bore to receive said stud; said base plate having an opening in the end remote from said cavity to receive a fastening member for fastening said base plate to a floor, and a stud in the end remote from said opening, adapted to enter a registering hole in the supporting floor.

4. A door bumper of the type adapted for mounting on a floor, comprising, in combination: a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient one piece rubber cushioning member having a portion shaped to fit snugly in said dome; and a portion projecting from said first portion past the plane of said opening; a stud located centrally of said bottom and projecting upwardly above the said bottom; said first cushioning member portion having a bore to receive said stud; said base plate having an opening in the end remote from said cavity to receive a fastening member for fastening said base plate to a floor, and a downwardly projecting stud in the end remote from said opening, adapted to enter a registering hole in the supporting floor.

5. A door bumper of the type adapted for mounting on a floor, comprising, in combination: a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall; a resilient one piece rubber cushioning member having a portion shaped to fit snugly in said dome; and a portion projecting from said first portion past the plane of said opening; a stud located centrally of said bottom and projecting upwardly above the said bottom; said first cushioning-member portion having a bore to receive said stud; said base plate having an opening in the end remote from said cavity to receive a fastening member for fastening said base plate to a floor, and a downwardly projecting stud in the end remote from said opening, adapted to enter a registering hole in the supporting floor; said bottom wall being a separate piece of material riveted to said base plate.

6. A door bumper of the type adapted for mounting on a floor, comprising, in combination: a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient one piece rubber cushioning member having a portion shaped to fit snugly in said dome; and a portion projecting from said first portion past the plane of said opening; a stud located centrally of said bottom and projecting upwardly above the said bottom; said first cushioning member portion having a bore to receive said stud; said base plate having an opening in the end remote from said cavity to receive a fastening member for fastening said base plate to a floor, and a downwardly projecting stud in the end remote from said opening, adapted to enter a registering hole in the supporting floor; said studs constituting the aligned upper and lower portions of a single cylindrical member.

7. A door bumper of the type adapted for mounting on a floor, comprising, in combination: a flat base plate adapted to lie on the floor; a hollow dome integral with said base plate and defining a cup-shaped cavity having an approximately spherical wall at one end of said plate, an opening lying in a transverse vertical plane and facing toward the opposite end of said plate, and a flat bottom wall; a resilient one piece rubber cushioning member having a portion shaped to fit snugly in said dome, and a portion projecting from said first portion past the plane of said opening; a stud projecting down from said dome through the center of said bottom and projecting below the said bottom; said first cushioning member portion having a bore to receive said stud; said base plate having an opening in the end remote from said cavity to receive a fastening member for fastening said base plate to a floor; said bottom wall being fastened to said stud to hold said bottom wall in place.

8. A door bumper of the type adapted for mounting on a floor, comprising, in combination:

a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient rubber cushioning member having a portion shaped to fit snugly in said dome; and a portion projecting from said first portion past the plane of said opening; a fastening member extending upward from the bottom of said cup-shaped cavity into said cushioning member and retaining said cushioning member in place; and a stud extending downwardly from the bottom of said cavity to enter a hole in a supporting structure.

9. A door bumper of the type adapted for mounting on a floor, comprising, in combination: a flat base plate adapted to lie on the floor; a hollow dome integral with said base plate and defining a cup-shaped cavity having an approximately spherical upper wall at one end of said plate, an opening lying in a transverse vertical plane and facing toward the opposite end of said plate, and a flat bottom wall constituted by part of said base plate; a resilient rubber cushioning member having a portion shaped to fit snugly in said dome; and a portion projecting from said first portion past the plane of said opening; a fastening member extending upward from the bottom of said cup-shaped cavity into said cushioning member and retaining said cushioning member in place; and two fastening members extending downward from said base at spaced points to attach said base to a supporting structure.

ELVIN H. JOHNSON.